United States Patent [19]
Foster

[11] 3,921,714
[45] Nov. 25, 1975

[54] WATERFLOODING EMPLOYING SURFACTANTS PRODUCED IN SITU

[75] Inventor: William R. Foster, Dallas, Tex.

[73] Assignee: Mobil Oil Corporation, New York, N.Y.

[22] Filed: Nov. 11, 1974

[21] Appl. No.: 522,801

[52] U.S. Cl. .............. 166/270; 166/273; 166/274
[51] Int. Cl.² ............................................ E21B 43/22
[58] Field of Search .......... 166/270, 273, 274, 271, 166/300, 307

[56] References Cited
UNITED STATES PATENTS

| | | | |
|---|---|---|---|
| 3,025,911 | 3/1962 | Bergman | 166/305 R |
| 3,330,347 | 7/1967 | Brown et al. | 166/270 |
| 3,344,858 | 10/1967 | Gilchrist et al. | 166/270 |
| 3,414,053 | 12/1968 | Treiber et al. | 166/273 |
| 3,581,824 | 6/1971 | Hurd | 166/270 |
| 3,777,818 | 12/1973 | Feuerbacher et al. | 166/274 |

OTHER PUBLICATIONS

Foster, W. R., "A Low-Tension Waterflooding Process," *Journal of Petroleum Technology*, Vol. 25, Feb. 1973, pp. 205–210.

*Primary Examiner*—Stephen J. Novosad
*Assistant Examiner*—George A. Suckfield
*Attorney, Agent, or Firm*—C. A. Huggett; William D. Jackson

[57] ABSTRACT

A waterflooding process involving the injection of an aqueous solution of an alkali metal fluoride and an alkaline agent to convert divalent metal soaps within the reservoir to the corresponding surface-active monovalent metal soaps.

8 Claims, 1 Drawing Figure

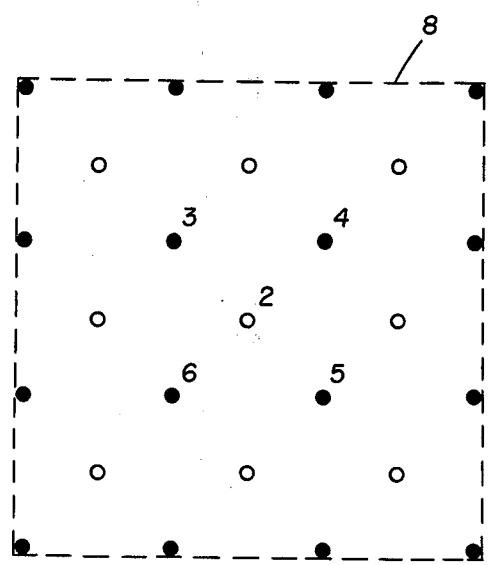

WATERFLOODING EMPLOYING SURFACTANTS PRODUCED IN SITU

BACKGROUND OF THE INVENTION

This invention relates to the recovery of oil from subterranean oil reservoirs and more particularly to improved waterflooding operations involving the in situ production of surfactants by converting divalent metal soaps of organic acids present in an oil reservoir to monovalent metal soaps.

In the recovery of oil from oil-bearing reservoirs, it is usually possible to recover only minor portions of the original oil in place by the so-called primary recovery methods which utilize only the natural forces present in the reservoir. Thus, a variety of supplemental recovery techniques have been employed in order to increase the recovery of oil from subterranean reservoirs. The most widely used supplemental recovery technique is waterflooding which involves the injection of water into an oil-bearing reservoir. As the water moves through the reservoir, it acts to displace oil therein to a production system composed of one or more wells through which the oil is recovered.

It has long been recognized that factors such as the interfacial tension between the injected water and the reservoir oil, the relative mobilities of the reservoir oil and injected water, and the wettability characteristics of the rock surfaces within the reservoir are factors which influence the amount of oil recovered by waterflooding. Thus, it has been proposed to add surfactants to the injected water in order to lower the oil-water interfacial tension and/or to alter the wettability characteristics of the reservoir rock. Also, it has been proposed to add thickening agents to all or part of the injected water in order to increase the viscosity thereof, thus decreasing the mobility ratio between the injected water and oil and improving the sweep efficiency of the waterflood.

Processes which involve the injection of aqueous surfactant solutions in order to reduce the oil-water interfacial tension are commonly referred to as low tension waterflooding techniques. To date, one of the more promising low tension waterflooding techniques involves the injection of aqueous solutions of petroleum sulfonates within a designated equivalent weight range and under controlled conditions of salinity. For example, in a paper by W. R. Foster entitled "A Low Tension Waterflooding Process," JOURNAL OF PETROLEUM TECHNOLOGY, Vol. 25, Feb. 1973, pp. 205–210, there is disclosed a procedure which involves the sequential injection of a protective slug, a surfactant slug, and a mobility control slug. The protective slug is an aqueous solution of sodium chloride which is injected in order to displace the reservoir water ahead of the subsequently injected surfactant slug. This slug is substantially free of divalent metal ions since petroleum sulfonates, like the various other anionic surfactants proposed for use in waterflooding, are precipitated by such ions. The sodium chloride functions to base exchange the reservoir solids, replacing divalent metal ions with sodium ions.

The surfactant slug comprises an aqueous solution of petroleum sulfonates and contains sodium chloride in a concentration, typically about 1.0 to 2.0 weight percent, which will promote the desired low interfacial tension between the injected water and the reservoir oil. The subsequently injected thickened water slug contains a viscosifier such as a water-soluble biopolymer in a graded concentration in order to provide an initial viscosity greater than the viscosity of the reservoir oil and a terminal viscosity near that of water. Thereafter, a driving fluid such as produced field brine is injected in order to carry the process to conclusion.

While recent emphasis has been placed upon the use of petroleum sulfonates in low tension waterflooding, numerous other surfactants have been proposed for use. These include various other anionic surfactants, such as the alkali metal soaps of long-chained organic acids as well as nonionic surfactants, such as ethoxylated alkyl phenols.

One problem encountered in surfactant waterflooding is the tendency of the surfactant to become adsorbed upon the solid surfaces within the reservoir. While adsorption is normally greatest when applying nonionic surfactants, significant adsorption is experienced with anionic surfactants. For example, the aforementioned Foster paper discloses the use of inorganic salts such as sodium tripolyphosphate and/or sodium carbonate to reduce surfactant adsorption. Another technique for reducing surfactant adsorption is disclosed in U.S. Pat. No. 3,777,818 to Feuerbacher et al. In this technique a surfactant slug, preferably containing a nonionic surfactant such as an ethoxylated substituted phenol, is preceded by an aqueous solution of hydrofluoric acid or sodium fluoride. The fluoride compound acts as a sacrificial agent to satisfy the adsorption sites on th reservoir rocks, thus reducing the adsorption of the subsequently injected surfactant. The sodium fluoride or hydrofluoric acid may also be present in the surfactant slug which may contain sodium chloride in addition to the surfactant.

Another waterflooding procedure, in which surfactants are formed in situ, involves alkaline waterflooding. In this process an aqueous solution of an alkali metal or ammonium hydroxide or carbonate is injected in order to neutralize organic acids in the reservoir oil to produce the corresponding alkali metal or ammonium salts. Alkaline waterflooding has been proposed in regard to various recovery mechanisms, i.e., to lower the interfacial tension between the reservoir oil and the injected water, to alter or even reverse the wettability of the reservoir, e.g., from oil-wet to water-wet, or for the purpose of mobility control by the formation of a relatively viscous oil and water emulsion.

An improved alkaline waterflooding process is described in U.S. Pat. application Ser. No. 508,965, filed Sep. 25, 1974 by Ralph F. Burdyn, Harry L. Chang, and William R. Foster, and entitled "Alkaline Waterflooding Process." In this process an aqueous alkaline solution is employed in which the alkalinity and monovalent salt salinity of the solution are controlled within defined ranges in order to result in low oil-water interfacial tensions which enhance the microscopic displacement of oil from the interstices of the reservoir rock. A thickened water slug may be used for the purpose of mobility control in the alkaline waterflood. As recognized in the Burdyn et al. application, the results achieved by alkaline waterflooding and the roles played by the various recovery mechanisms involved depend to some extent upon the molecular weight distribution of the organic acids within the reservoir oil.

An additional factor which is relevant to the efficacy of an alkaline waterflood is the total acid content of the reservoir oil. This is commonly measured by the "acid number" which is defined as the milligrams of potassium hydroxide required to neutralize the acids in one gram of crude oil in a nonaqueous type titration.

Various procedures have been proposed for the alkaline waterflooding of those reservoirs in which the crude oil is considered to have an inadequate acid content as indicated by the acid number. One technique disclosed in U.S. Pat. No. 3,330,347 to Brown et al. involves the injection of an oil slug containing relatively high molecular weight organic acids followed by a basic flooding medium which forms surfactants by reaction between the basic water and the previously injected acids. In this process, the floodwater prior to injection is treated with a chelating agent in order to reduce the concentration of divalent ions such as calcium and magnesium ions which have an adverse effect upon the in-situ generated surfactants. Yet a further technique disclosed in U.S. Pat. No. 3,344,858 to Gilchrist et al. involves an alkaline waterflood process in which an aqueous alkaline slug is injected first and then followed with a hydrocarbon slug containing organic acids. These acids are neutralized in situ to form the corresponding surface-active salts.

SUMMARY OF THE INVENTION

In accordance with the present invention there is provided a waterflooding process in which the surfactants are produced in situ by converting oil-soluble divalent metal soaps within the reservoir oil to surface-active monovalent metal soaps. In carrying out the invention at least 0.03 pore volume of an aqueous solution containing an alkaline agent and an alkali metal fluoride is injected into a subterranean oil reservoir through a suitable injection system. The alkali metal fluoride and the heavy metal soaps, principally the calcium soaps, react within the reservoir to produce the corresponding monovalent metal soaps, which are surface active, and calcium fluoride. An aqueous flooding medium is injected in order to displace the reservoir oil to a production system penetrating the reservoir and from which the oil is recovered.

BRIEF DESCRIPTION OF THE DRAWING

The drawing is an illustration exhibiting one form of a well pattern which may be employed in practicing the present invention.

DESCRIPTION OF THE SPECIFIC EMBODIMENTS

As noted previously, the various alkaline waterflooding procedures require the presence of organic acids that may be neutralized with alkaline agents such as sodium hydroxide to form water-soluble soaps. As recognized by the prior art, these organic acids may be indigenous to the reservoir crude oil; or, where the reservoir oil contains insufficient acids, they may be added to the reservoir oil by various injection procedures.

In some cases the reservoir oil may itself exhibit a relatively low organic acid content as indicated by its acid number, but may contain significant amounts of metallic soaps, that is, soaps of the long-chained paraffinic or naphthenic acids or other organic acids and the divalent metals, such as calcium, magnesium, and barium. Such metallic soaps are particularly likely to be prominent in those crude oils which are associated with reservoir water having a high divalent metal ion content and a basic or neutral pH. Normally, calcium ions will predominate with lesser amounts of magnesium and usually only trace amounts of barium.

In some instances, oil produced from a reservoir high in divalent metal ion content will not only exhibit a low acid number, but analysis will show it to contain only small amounts of the heavy metallic soaps. It is believed that such analysis does not always accurately reflect the organic acid content of the reservoir and that significant amounts of divalents metallic soaps are adsorbed on the reservoir rock surfaces. In accordance with the present invention, there is provided a technique whereby both dissolved and adsorbed metallic soaps may be converted in situ to their corresponding monovalent metal soaps in order to decrease interfacial tension between the reservoir oil and the injected water.

The present invention may be carried out utilizing injection and production systems as defined by any suitable arrangement of wells. One well arrangement commonly used in waterflooding operations and suitable for use in practicing the present invention is an integrated five-spot pattern of the type illustrated in the drawing. In the drawing, the legend o is used to indicate a production well as the legend ● is used to indicate an injection well. As shown in the drawing, this integrated pattern comprises a plurality of five-spot patterns, each of which comprises a central production well, as indicated by reference numeral 2, and four peripheral injection wells, as indicated by reference numerals 3, 4, 5, and 6. By the term "pore volume," as used herein to define the quantities of fluid injected, is meant the pore volume of the formation underlying the well pattern defined by the wells comprising the injection and production systems. Thus, the term pore volume as used with reference to the pattern shown in the drawing is the pore volume of that portion of the formation underlying the area enclosed by broken line 8. Of course, other well arrangements may be used in carrying out the present invention, examples of which are set forth in the previously mentioned Burdyn et al. application.

In carrying out the present invention, an aqueous solution of an alkaline agent and alkali metal fluoride is injected into the reservoir via the injection system comprised of wells 3, 4, 5, and 6. The calcium soaps within the reservoir will react with the injected sodium fluoride to produce the corresponding sodium soaps in accordance with the following reaction in which the organic acid radical is indicated by R:

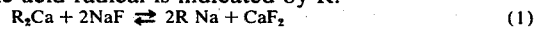
$$R_2Ca + 2NaF \rightleftarrows 2R\,Na + CaF_2 \qquad (1)$$

The reaction itself is of course reversible. However, since calcium fluoride is highly insoluble in water, having a solubility of 0.0016 gram per hundred milliliters in cold water, the precipitation of calcium fluoride will tend to drive the reaction to the right.

The resulting sodium soaps are highly water soluble and in a neutral or acidic environment will tend to be hydrolyzed to their corresponding oil-soluble acids, in accordance with the following reaction:

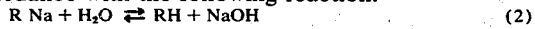
$$R\,Na + H_2O \rightleftarrows RH + NaOH \qquad (2)$$

This reaction is driven to the left to maintain the water-soluble sodium salts by the presence of the alkaline agent.

The aqueous solution of fluoride and alkaline agent is injected in an amount of at least 0.03 pore volume in order to provide adequate amounts of these materials for reactions (1) and (2) and to provide, upon conversion of the divalent metal soaps to monovalent metal soaps, a substantial surfactant zone within the reservoir. It usually will be unnecessary for the fluoride-alkaline agent slug to exceed 0.2 pore volume and a preferred slug size is within the range of 0.1 to 0.2 pore volume.

The alkaline agent, preferably, will be present in an amount as taught by the aforementioned Burdyn et al. application to provide a pH in the alkali metal fluoride solution within the range of 11.5 to 13 in order to maintain the organic acids in the neutralized state and to promote the desired low interfacial tension between the injected water and the reservoir oil. The preferred alkaline agent is sodium hydroxide although other alkali metal hydroxides or carbonates may be used in the present invention. Sodium hydroxide should be present in a concentration within the range of 0.005 to 0.1 N in order to adjust the pH of the solution as described above.

The alkali metal fluoride preferably is present in a concentration within the range of 0.02 to 0.1 N in order to provide adequate amounts of monovalent metal soaps at the interface between the injected water and the reservoir oil. Sodium fluoride normally will be used for this purpose.

As noted previously, calcium is the predominant divalent metal ion present in reservoir environments in which the invention is practiced and most of the monovalent metal soaps will be derived from calcium soaps. However, reactions analogous to reaction (1) above will precede with respect to the magnesium and to the barium soaps, although with lower equilibrium constants since magnesium and barium fluoride exhibit a somewhat greater solubility in water than calcium fluoride. Where appreciable amounts of barium ions are present, it may be desirable to provide some sulfate ions in the injected solution since barium sulfate exhibits a solubility in water of 0.00023 gram per hundred milliliters as compared to a solubility of 0.12 gram per hundred milliliters for barium fluoride.

In addition to the presence of the alkali metal fluoride and alkaline agent, it is preferred also to add an alkali metal chloride to the injected aqueous solution in order to enhance the interfacial tension reduction mechanism in the oil displacement process. The preferred alkali metal chloride concentration normally will be within the range of 0.5 to 2.0 weight percent as described in greater detail in the aforementioned Burdyn et al. application. The salinity of the aqueous fluoride solution usually will be controlled by the addition of sodium chloride since this salt is inexpensive and readily available; however, salinity control can be ccomplished by means of other alkali metal chlorides.

As noted previously, it is a conventional practice in various low tension waterflooding applications involving anionic surfactants to inject an aqueous protective slug in order to avoid surfactant precipitation by divalent ions. In the present invention, the sodium fluoride slug, itself, will remove calcium ions from solution by precipitation of calcium chloride and in some cases the use of a protective slug may be unnecessary. However, this competing reaction will reduce the amount of sodium fluoride available for reaction (1) and it usually will be preferred to inject a protective slug ahead of the alkali metal fluoride solution in order to displace the formation brine ahead of this solution. The use of a protective slug becomes particularly important when the reservoir water contains large amounts of divalent ions which upon precipitation as insoluble fluorides will tend to cause plugging of the reservoir. The protective slug normally will contain sodium chloride or other alkali metal chloride in the range of 0.5 to 2.0 weight percent and should, of course, be substantially free of divalent ions. As a practical matter, water containing divalent ions in a concentration no greater than 50 parts per million may be used in forming the protective slug as well as the subsequently injected slugs. The protective slug normally will be injected in an amount within the range of 0.1 to 0.2 pore volume.

In carrying out the invention, it usually will be desirable to inject a thickening agent for mobility control purposes. The thickening agent may be added initially to the aqueous fluoride solution or may be injected in a separate aqueous slug. Usually, it will be preferred to inject the thickening agent in a mobility control slug subsequent to the injection of at least an initial portion of the aqueous fluoride solution and to adjust the alkalinity and salinity of the mobility control slug to values within the ranges set forth above. The viscosity of the mobility control slug is greater than the viscosity of the initially injected aqueous fluoride solution and normally will fall within the range of one to four times the viscosity of the reservoir oil.

Various thickening agents which may be employed to increase the viscosity or apparent viscosity of the mobility control slug are well known to those skilled in the art and include such naturally occurring materials as guar gum or Karaya gum, or such synthetic materials as the polysaccharide B-1459 available from the Kelco Chemical Company under the trade name "Kelzan," poly(glucosylglucan)s, such as disclosed in U.S. Pat. No. 3,372,749 to Williams, and available from the Pillsbury Company under the trade name "Polytran," or the partially hydrolyzed polyacrylamides available from the Dow Chemical Company under the trade name of "Pusher Chemicals." An ionic polysaccharide such as Kelzan usually will be preferred as the thickening agent for reasons set forth more fully in the aforementioned Burdyn et al. application.

The mobility control slug typically will be injected in an amount within the range of 0.1 to 0.3 pore volume. The viscosity of the mobility control slug preferably is graded from a maximum viscosity of at least the viscosity of the reservoir oil to the viscosity of water. This is accomplished by progressively decreasing the concentration of polymeric thickening agent from its maximum value, normally a concentration within the range of 250 to 2,500 ppm in the case of Kelzan, down to a concentration of zero. The thickening agent concentration may be decreased linearly or nonlinearly by increments.

Subsequent to the injection of the mobility control slug, a driving fluid is injected in order to displace the previously injected fluids through the formation. The driving fluid typically may be any water which is locally available and is not incompatible with the formation. The driving fluid is injected in an amount required to carry the displacement process to completion.

I claim:

1. In the recovery of oil from a subterranean oil reservoir penetrated by spaced injection and production systems, the method comprising:
   a. introducing into said reservoir via said injection system an amount of at least 0.03 pore volume of an aqueous solution of an alkaline agent and an alkali metal fluoride whereby calcium soaps within said reservoir are converted to monovalent metal soaps, b. thereafter introducing into said reservoir via said injection system an aqueous flooding medium to displace oil to said production system, and c. recovering oil from said production system.

2. The method of claim 1 wherein said alkali metal fluoride comprises sodium fluoride in a concentration range of 0.02 to 0.1 N.

3. The method of claim 1 wherein said aqueous solution of step (a) is injected in an amount within the range of 0.1 to 0.2 pore volume.

4. The method of claim 1 wherein said aqueous solution contains an alkali metal chloride in a concentration within the range of 0.5 to 2.0 weight percent.

5. The method of claim 1 wherein said alkaline agent comprises an alkali metal hydroxide in a concentration range of 0.005 to 0.1 N.

6. The method of claim 5 wherein said alkali metal hydroxide is sodium hydroxide.

7. The method of claim 1 further comprising the step of prior to the injection of said aqueous solution introducing into said reservoir via said injection system an aqueous protective slug which is substantially free of divalent metal salts and contains an alkali metal chloride in a concentration within the range of 0.5 to 2.0 weight percent.

8. In the recovery of oil from a subterranean oil reservoir penetrated by spaced injection and production systems, the method comprising:

a. introducing into said reservoir via said injection system a protective slug comprising an aqueous solution of sodium chloride which is substantially free of divalent metal salts, b. thereafter introducing into said reservoir via said injection system an amount of at least 0.03 pore volume of an aqueous solution of sodium chloride, an alkaline agent, and sodium fluoride whereby calcium soaps within said reservoir are converted to sodium soaps, c. thereafter introducing into said reservoir via said injection system an aqueous mobility control slug containing a thickening agent and sodium chloride, d. thereafter introducing a driving fluid into said reservoir via said injection system to displace oil to said production system, and e. recovering oil from said production system.

\* \* \* \* \*